(12) United States Patent
Yasui

(10) Patent No.: US 8,355,205 B2
(45) Date of Patent: Jan. 15, 2013

(54) OPTICAL ELEMENT AND OPTICAL SYSTEM INCLUDING THE SAME

(75) Inventor: Hiroto Yasui, Saitama (JP)

(73) Assignee: Canon Kabushiki Kaisha (JP)

( * ) Notice: Subject to any disclaimer, the term of this patent is extended or adjusted under 35 U.S.C. 154(b) by 415 days.

(21) Appl. No.: 12/815,991

(22) Filed: Jun. 15, 2010

(65) Prior Publication Data

US 2010/0321782 A1    Dec. 23, 2010

(30) Foreign Application Priority Data

Jun. 17, 2009   (JP) ................... 2009-144177

(51) Int. Cl.
    *G02B 5/18*   (2006.01)
(52) U.S. Cl. ....................................... 359/576
(58) Field of Classification Search .......... 359/569, 359/576
    See application file for complete search history.

(56) References Cited

U.S. PATENT DOCUMENTS

| 6,381,079 | B1 | 4/2002 | Ogawa |
| 2005/0128599 | A1 | 6/2005 | Ogawa |
| 2006/0109557 | A1 | 5/2006 | Maetaki |

FOREIGN PATENT DOCUMENTS

| EP | 1933185 A1 * | 6/2008 |
| JP | 2000-258685 A | 9/2000 |
| JP | 2005-181392 A | 7/2005 |
| JP | 2006-145823 A | 6/2006 |

* cited by examiner

*Primary Examiner* — Alessandro Amari
*Assistant Examiner* — Kimberly N Kakalec
(74) *Attorney, Agent, or Firm* — Rossi, Kimms & McDowell LLP

(57) ABSTRACT

Provided are an optical element in which a thickness of a refractive optical portion having an extraordinary partial dispersion characteristic is suitably specified to minimize flare generated by a diffraction optical portion, to thereby sufficiently correct chromatic aberrations to obtain excellent optical performance, and an optical system including the optical element. The optical system includes a cemented portion in which the refractive optical portion made of a solid material and has a refractive action is brought into intimate contact with at least one of light incident and exiting surfaces of the diffraction optical portion having a plurality of diffraction gratings which are layered. An Abbe (νd), a partial dispersion ratio (θgF), and an extraordinary partial dispersion ratio (ΔθgF) of the solid material are suitably set.

11 Claims, 10 Drawing Sheets

OPTICAL ELEMENT AND OPTICAL SYSTEM INCLUDING THE SAME

BACKGROUND OF THE INVENTION

1. Field of the Invention

The present invention relates to an optical element and an optical system including the optical element, which are suitable for optical apparatuses such as a silver-halide film camera, a video camera, a digital still camera, a projector, a telescope, and an image reading apparatus.

2. Description of the Related Art

Up to now, there has been known an optical system, in which glass having extraordinary partial dispersion and low dispersion, for example, fluorite or FK01 (product name), is used for a positive lens, and high-dispersion glass is used for a negative lens, to thereby correct chromatic aberrations. There has also been known an optical system, in which a fine particle dispersion material obtained by mixing fine particles, such as ITO or $TiO_2$, into a resin material or a resin material having an extraordinary partial dispersion characteristic is used to correct chromatic aberrations (Japanese Patent Application Laid-Open No. 2005-181392 and Japanese Patent Application Laid-Open No. 2006-145823). There has also been known an optical system, in which a diffraction optical element having a negative dispersion characteristic (vd=−3.453) or strong extraordinary dispersion (θgF=0.296) different from normal glass material is used so as to correct chromatic aberrations. There has also been known an optical system in which a periodical structure of a diffraction grating is changed to obtain aspherical efficiency (Japanese Patent Application Laid-Open No. 2000-258685).

When one of the fine particle dispersion material and the resin material each having the extraordinary partial dispersion characteristic is used, the correction of chromatic aberrations of an optical system and a reduction in size of the entire system are facilitated. However, the thickness of a material to be used, of the materials is limited in view of formability. When a material having large absorption and scattering in a visible wavelength region is used as the fine particle dispersion material, it is necessary to minimize the thickness of the material in view of transmittance. In this case, it is important to balance between the correction of chromatic aberrations of the optical system and the reduction in size of the entire system, and the thickness of the material. When a diffraction optical element is used for the optical system, the correction of chromatic aberrations is facilitated. However, when there is diffraction light of unnecessary diffraction order other than image pickup light (design order), the diffraction light acts as flare light and significantly degrades imaging performance. For example, when there is intense light, for example, sunlight outside a screen and the diffraction optical element is exposed to the light, the entire screen becomes blurred (flare or ghost), to thereby reduce the contrast of the entire screen.

SUMMARY OF THE INVENTION

An object of the present invention is to provide an optical element in which a thickness of a refractive optical portion made of a solid material having an extraordinary partial dispersion characteristic is suitably specified to minimize flare generated by a diffraction optical portion, to thereby sufficiently correct chromatic aberrations to obtain excellent optical performance, and an optical system including the optical element.

An optical element according to the present invention includes a cemented portion including: a diffraction optical portion including a plurality of diffraction gratings which are layered, the diffraction optical portion having a light incident surface and a light exiting surface; and a refractive optical portion which includes a solid material and has a refraction action, the refractive optical portion being in intimate contact with at least one of the light incident surface and the light exiting surface, in which the following conditional equations are satisfied:

$$0.01 < |\Delta\theta gF| < 0.50; \text{ and}$$

$$vd < 60,$$

where vd and θgF indicate an Abbe number and a partial dispersion ratio of the solid material, respectively, and ΔθgF indicates an extraordinary partial dispersion ratio and where $\Delta\theta gF = \theta gF - (-1.665 \times 10^{-7} \times vd^3 + 5.213 \times 10^{-5} \times vd^2 - 5.656 \times 10^{-3} \times vd + 0.7278)$.

According to the present invention, an optical element in which the thickness of the refractive optical portion made of the solid material having the extraordinary partial dispersion characteristic is suitably specified to minimize flare generated by the diffraction optical portion, to thereby sufficiently correct chromatic aberrations to obtain excellent optical performance, and an optical system including the optical element may be provided.

Further features of the present invention will become apparent from the following description of exemplary embodiments with reference to the attached drawings.

DESCRIPTION OF THE EMBODIMENTS

Figure 1:
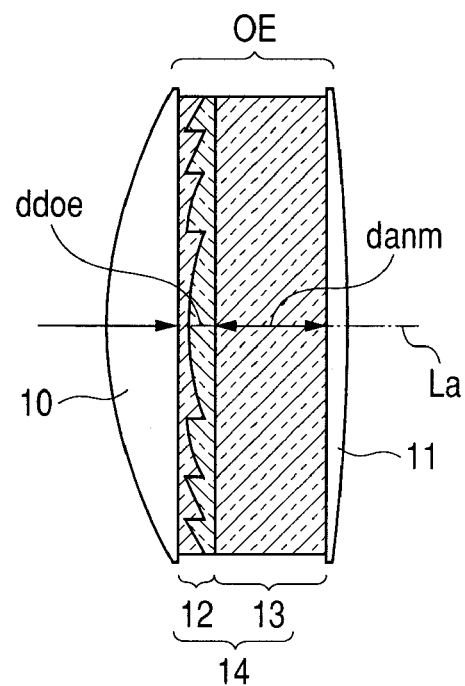
FIG. 1 is an element cross sectional view illustrating an optical element according a first embodiment of the present invention.
Figure 2:
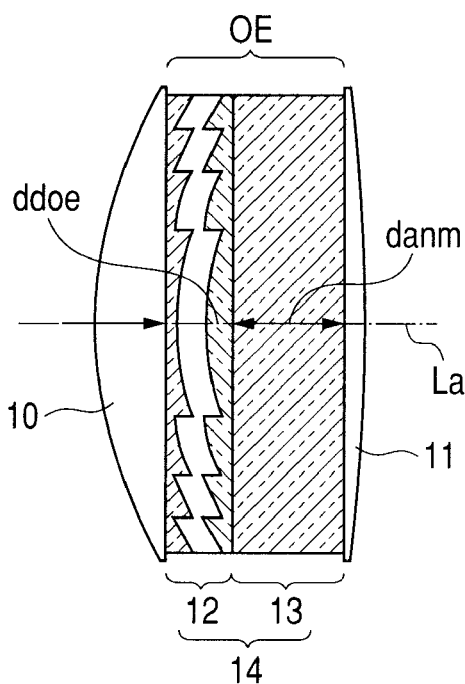
FIG. 2 is an element cross sectional view illustrating an optical element according a second embodiment of the present invention.

Preferred embodiments of the present invention will now be described in detail in accordance with the accompanying drawings.

An optical element OE of the present invention includes a cemented portion 14 in which a diffraction optical portion 12 and a refractive optical portion 13 are brought into intimate contact with each other. The diffraction optical portion includes a plurality of diffraction gratings which are layered. The refractive optical portion is provided on at least one of light incident and exiting surfaces of the diffraction optical portion 12, is made of a solid material, and has a refractive action. The cemented portion is sandwiched by two flat plates or two optical members such as lens members and brought into intimate contact therewith. The refractive optical portion having the refractive action is, for example, a refractive lens generating power with the refractive action, and does not include a diffraction optical portion generating power with a diffraction action. The solid material is a material which is solid in a state in which an optical system is used. The solid material may be any state before the optical system is used, for example, during manufacturing. For example, even if a material is liquid during manufacturing, a solid material obtained by curing the liquid material corresponds to the solid material described above. For example, the solid material includes a mixture in which ultraviolet curable resins or inorganic fine particles are dispersed in a resin material.

Next, an optical element and an optical system including the optical element according to each of embodiments of the present invention are described. FIGS. 1 to 4 are element structural views illustrating optical elements (diffraction optical elements) OE according to first to fourth embodiments of the present invention. Each of the optical elements OE according to the embodiments includes glass substrates 10 and 11, the diffraction optical portion 12, and the refractive optical portion 13, which are brought into intimate contact with each other. In this case, a thickness of the diffraction optical portion 12 along an optical axis La is represented by ddoe and a thickness of the refractive optical portion 13 along the optical axis La is represented by danm. FIGS. 1 to 4 are views obtained by significant deformation in the thickness direction. In FIGS. 1 to 4, the glass substrates 10 and 11 are plano-convex lenses and an interface between the diffraction optical portion 12 and the refractive optical portion 13 is flat. However, the present invention is not limited thereto. The glass substrates 10 and 11 may be planes or optical members such as biconvex lenses or biconcave lenses. An interface between the respective portions may be curved.

In each of the embodiments, the refractive optical portion 13 is brought into intimate contact with at least one of light incident and exiting surfaces of the diffraction optical portion 12 to serve as the cemented portion 14, together with the diffraction optical portion 12. The optical element OE includes at least one cemented portion 14. In each of the first and second embodiments illustrated in FIGS. 1 and 2, the optical element OE includes the cemented portion 14 in which the refractive optical portion 13 is brought into intimate contact with one of interfaces (light incident and exiting surfaces) of the diffraction optical portion 12. The diffraction optical portion 12 illustrated in FIG. 1 has a cemented two-layer structure. The diffraction optical portion 12 illustrated in FIG. 2 has a two-layered structure. The diffraction optical portion 12 is not limited to the structures described above and any structure in which desired high diffraction efficiency is obtained may be employed. The refractive optical portion 13 is provided between the diffraction optical portion 12 and the glass substrate 11, but may be provided between the diffraction optical portion 12 and the glass substrate 10.

Figure 3:
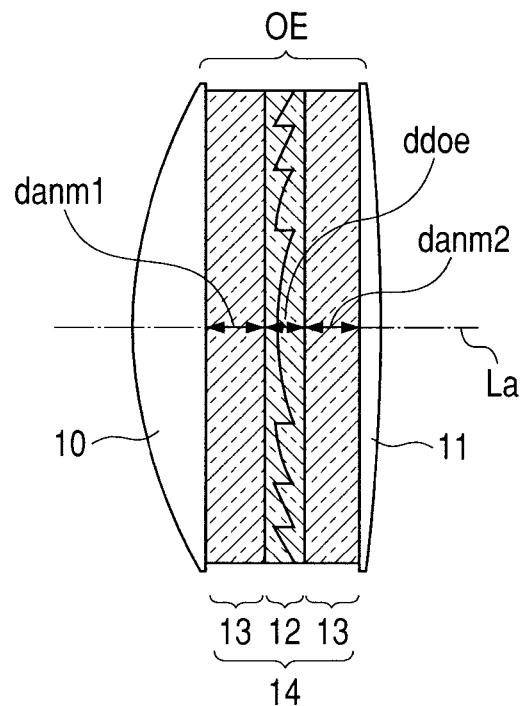
FIG. 3 is an element cross sectional view illustrating an optical element according a third embodiment of the present invention.
Figure 4:
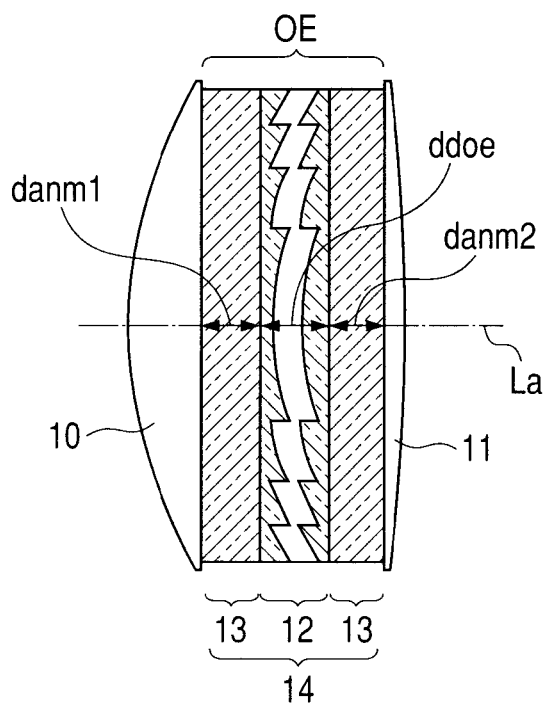
FIG. 4 is an element cross sectional view illustrating an optical element according a fourth embodiment of the present invention.

In each of the third and fourth embodiments illustrated in FIGS. 3 and 4, the optical element OE includes the cemented portion 14 in which the refractive optical portions 13 are brought into intimate contact with both interfaces (light incident and exiting surfaces) of the diffraction optical portion 12. The diffraction optical portion 12 illustrated in FIG. 3 has a cemented two-layer structure. The diffraction optical portion 12 illustrated in FIG. 4 has a two-layered structure. The diffraction optical portion 12 is not limited to the structures described above and any structure in which desired high diffraction efficiency is obtained may be employed. The formability on each surface in the case where the refractive optical portions 13 are provided on both sides of the diffraction optical portion 12 is more excellent than in the case where the refractive optical portion 13 is provided on one side thereof. Thicknesses danm1 and danm2 of the refractive optical portions 13 may be equal to or different from each other. In each of the embodiments, a solid material contained in the refractive optical portion 13 includes a mixture in which ultraviolet curable resins or inorganic fine particles are dispersed in a resin material. A material contained in the diffraction optical portion 12 includes a mixture in which two or more different kinds of ultraviolet curable resins or inorganic fine particles are dispersed in a resin material. The solid material of the refractive optical portion 13 and materials of the diffraction optical portion 12 may be all different from one another. Further, the solid material of the refractive optical portion 13 may be identical to at least one of the materials of the diffraction optical portion 12.

In each of the embodiments, assume that an Abbe number and a partial dispersion ratio of the solid material contained in the refractive optical portion 13 are represented by $\mu d$ and $\theta gF$, respectively, and an extraordinary partial dispersion ratio is represented by $\Delta\theta gF$. When refractive indexes of the solid material with respect to a d-line, a g-line, an F-line, and a C-line are represented by nd, ng, nF, and nC, respectively, the Abbe number $\nu d$ and the partial dispersion ratio $\theta gF$ are expressed by the following expressions.

$$\nu d=(nd-1)/(nF-nC)$$

$$\theta gF=(ng-nF)/(nF-nC)$$

The extraordinary partial dispersion ratio $\Delta\theta gF$ is expressed by the following expression.

$$\Delta\theta gF = \theta gF - (-1.665\times10^{-7}\times vd^3 + 5.213\times10^{-5}\times vd^2 - 5.656\times10^{-3}\times vd + 0.7278)$$

In this case, each of embodiments satisfies the following conditional equations.

$$0.01 < |\Delta\theta gF| < 0.50 \quad (1)$$

$$vd < 60 \quad (2)$$

Figure 13:
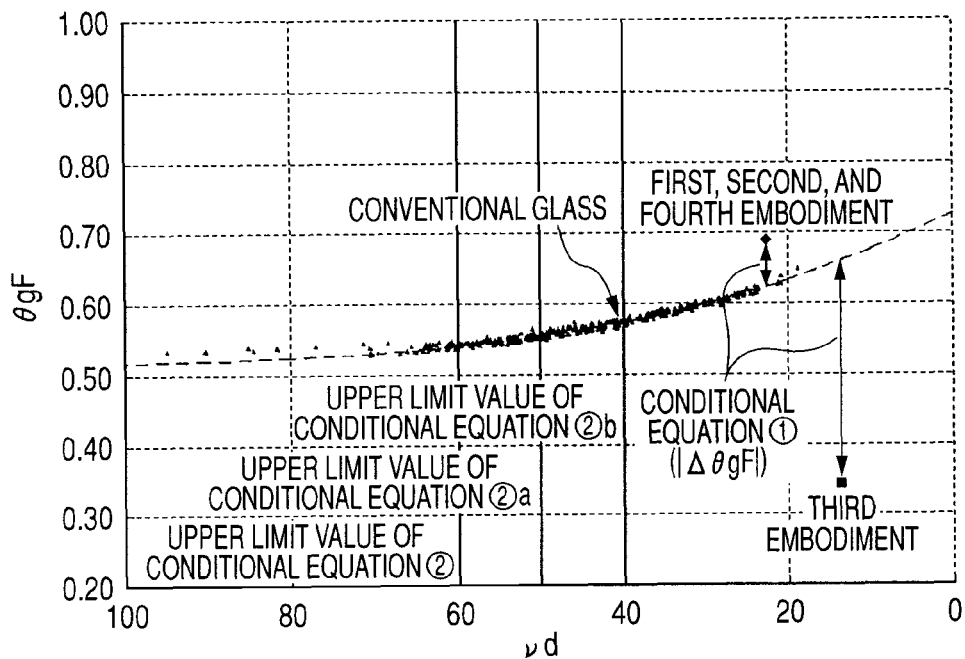
FIG. 13 is an explanatory diagram illustrating an existing region of a material having an extraordinary partial dispersion characteristic in the present invention.

Conditional Equations (1) and (2) specify an existing region of the solid material having the extraordinary partial dispersion characteristic (resin material or fine particle dispersion material). For ease of imagining, the relationship among the respective conditional equations is described with reference to FIG. 13. FIG. 13 illustrates the relationship between the partial dispersion ratio $\theta gF$ and the Abbe number $vd$. The ordinate indicates the partial dispersion ratio $\theta gF$ and the abscissa indicates the Abbe number $vd$. An expression of "$(-1.665\times10^{-7}\times vd^3 + 5.213\times10^{-5}\times vd^2 - 5.656\times10^{-3}\times vd + 0.7278)$" which is a part of the expression described above is obtained by curve approximation in a distribution region of a conventional glass material illustrated in FIG. 13.

As is apparent from FIG. 13, the solid materials used in the present invention are within a region separated from an existing region of the conventional glass material in a longitudinal direction in FIG. 13. The degree of separation corresponds to the extraordinary partial dispersion ratio $\Delta\theta gF$ of Conditional Equation (1). When an absolute value of the extraordinary partial dispersion ratio $\Delta\theta gF$ becomes larger (distance from approximation curve increases), the extraordinary partial dispersion characteristic becomes stronger. It is apparent that each of the materials used in the embodiments of the present invention has the strong extraordinary partial dispersion characteristic. Existing positions of the solid materials used in the respective embodiments are plotted in FIG. 13. However, when the ranges of Conditional Equations (1) and (2) are satisfied, the present invention is not limited to the positions.

In the embodiments of the present invention, the diffraction optical portion and the refractive optical portion are brought into intimate contact with each other. Therefore, a linear characteristic (extraordinary partial dispersion ratio $\Delta\theta gF$ corresponds to significant separation up to lower right position in FIG. 13) of the diffraction optical portion and a non-linear characteristic (extraordinary partial dispersion ratio $\Delta\theta gF$ corresponds to separation up to higher right position in FIG. 13) of the refractive optical portion may be simultaneously obtained. Thus, the chromatic aberrations of the optical system may be excellently corrected as compared with the case where the diffraction optical portion and the refractive optical portion are separately used. When a suitable balance is achieved between both the diffraction optical portion and the refractive optical portion, the power of the diffraction optical portion may be reduced to reduce flare. In addition, the refractive optical portion may be thinned.

When $|\Delta\theta gF|$ falls below the lower limit value of Conditional Equation (1), a material having an optical characteristic unchanged from the conventional glass material is obtained, and hence it is difficult to correct the chromatic aberration of the optical system. Therefore, it is difficult to obtain an optical element intended for the present invention. When $|\Delta\theta gF|$ exceeds the upper limit value of Conditional Equation (1), a material significantly changed from the conventional glass material is obtained, and hence this is not preferred because the correction may not be achieved by a practical material. When $vd$ exceeds the upper limit value of Conditional Equation (2), it is difficult to correct respective chromatic aberrations and various other aberrations of the entire optical system by the optical element introduced into the optical system. The numerical ranges of Conditional Equations (1) and (2) are preferred to be set to the following ranges. Thus, the balance between the refractive power of the diffraction optical portion and the refractive power of the refractive optical portion is further improved to increase a chromatic aberration correction effect, and hence excellent optical performance is obtained.

$$0.03 < |\Delta\theta gF| < 0.40 \quad (1a)$$

$$vd < 50 \quad (2a)$$

The numerical value of Conditional Equation (2a) is further preferred to be set as follows.

$$vd < 40 \quad (2b)$$

It is preferred to satisfy at least one of the following respective conditional equations in the present invention in order to reduce flare generated by the diffraction optical portion 12 and thin the refractive optical portion 13. It is also preferred to satisfy at least one of the following respective conditional equations in order to realize a small-size optical system of which chromatic aberrations are sufficiently corrected. Assume that, in the optical element OE, the thickness of the diffraction optical portion 12 along the optical axis is represented by ddoe and the thickness of the refractive optical portion 13 along the optical axis is represented by danm. In this case, the following conditional equations are preferred to be satisfied.

$$0.001 < ddoe/danm \leq 1.000 \quad (3)$$

$$ddoe \leq 0.1 \text{ (mm)} \quad (4)$$

With respect to the thickness ddoe of the diffraction optical portion 12 along the optical axis and the thickness danm of the refractive optical portion 13 along the optical axis, when the plurality of diffraction optical portions 12 and the plurality of refractive optical portions 13 are provided, sums of thicknesses of the respective portions along the optical axis are used.

Conditional Equations (3) and (4) specify the relationship between the thicknesses of the diffraction optical portion 12 and the refractive optical portion 13 along the optical axis in the optical element OE. When ddoe/danm falls below the lower limit value of Conditional Equation (3), the refractive optical portion 13 becomes too thick and formation is difficult. This is not preferred. When the solid material of the refractive optical portion 13 is a fine particle dispersion material, it is likely to reduce transmittance. This is not preferred. When ddoe/danm exceeds the upper limit value of Conditional Equation (3), the refractive optical portion 13 becomes too thin. Therefore, a desired refractive power is not obtained for the optical element OE, it is difficult to correct chromatic aberrations, and a chromatic aberration correction sharing balance with the diffraction optical portion 12 degrades. This is not preferred. When ddoe exceeds the upper limit value of Conditional Equation (4), the diffraction optical portion 12 becomes too thick and formation is difficult. This is not preferred. When the material of the diffraction optical portion 12 is a fine particle dispersion material, it is likely to reduce transmittance. This is not preferred.

The numerical ranges of Conditional Equations (3) and (4) are preferred to be set to the following ranges because the formability of the refractive optical portion 13 is improved.

$$0.005 < ddoe/danm \leq 0.800 \quad (3a)$$

$$ddoe \leq 0.08 \text{ (mm)} \quad (4a)$$

The numerical ranges of Conditional Equations (3a) and (4a) are further preferred to be set as follows.

$$0.01 < ddoe/danm \leq 0.50 \quad (3b)$$

$$ddoe \leq 0.05 \text{ (mm)} \quad (4b)$$

According to the respective embodiments as described above, the thickness of the refractive optical portion having the extraordinary partial dispersion characteristic is suitably specified to minimize flare generated by the diffraction optical portion, to thereby sufficiently correct chromatic aberrations to obtain excellent optical performance.

Next, optical systems according to embodiments into which the optical elements OE according to the first to fourth embodiments described above are introduced are described. FIGS. 5, 7, 9, and 11 are lens cross sectional views illustrating optical systems according to fifth to eighth embodiments of the present invention. FIGS. 6, 8, 10, and 12 are aberration diagrams in the optical systems according to the fifth to eighth embodiments of the present invention, respectively, when an object distance is infinite. Numerical Examples 1 to 4 described later correspond to the fifth to eighth embodiments, respectively. The optical systems according to the present invention are used for optical devices such as a digital camera, a video camera, a silver-halide film camera, a telescope, a binocular observation apparatus, a copying machine, and a projector. In the lens cross sectional views, the left is the front side (object side or enlargement side) and the right is the rear side (image plane side or reduction side). When any one of the optical systems is used for an image projection apparatus, for example, a projector, the left corresponds to a screen side and the right corresponds to a projected image side. An aperture stop (stop) S is provided to adjust the amount of light. A front unit LF is located closer to the object side than the aperture stop S and includes at least one lens unit.

A rear unit LR is located closer to the image plane side than the aperture stop S and includes at least one lens unit. An image plane IP is provided. When the optical system is used as an image taking optical system of a video camera or a digital still camera, a photosensitive surface corresponding to an image pickup surface of a solid-state image pickup element (photoelectric transducer), for example, a CCD sensor or a CMOS sensor is provided as the image plane. During focusing from an infinitely distant object to a nearest object, a focusing lens unit Lfo is moved to the image side as illustrated by an arrow. An image stabilizing lens unit LIS is moved to have a component in a direction perpendicular to the optical axis, to thereby correct image blurring caused by the vibration of the optical system due to hand movement. A glass block G, for example, a filter, a face plate, or a color separation prism is provided.

In each of the aberration diagrams, with respect to spherical aberration, a solid line d indicates the d-line, a chain double-dashed line g indicates the g-line, a chain line C indicates the C-line, and a dotted line F indicates the F-line. With respect to astigmatism, a solid line indicates an image plane AS of a sagittal ray and a dotted line indicates an image plane AM of a meridional ray. With respect to lateral chromatic aberration, a chain double-dashed line g indicates the g-line, a chain line C indicates the C-line, and a dotted line F indicates the F-line. Reference symbol Fno represents an F-number and ω represents a half field angle. The optical system according to each of the fifth to eighth embodiments includes the front unit LF located on the object side of the aperture stop S and the rear unit LR located on the image side thereof. The front unit LF includes at least one optical element OE including the refractive optical portion satisfying Conditional Equations (1) and (2).

In the optical system using the optical element OE according to each of the fifth to eighth embodiments, a focal length of the diffraction optical portion 12 is represented by fdoe and a focal length of the refractive optical portion 13 is represented by fanm. In this case, the following conditional equation is satisfied.

$$0.01 < |fanm/fdoe| < 1.00 \quad (5)$$

Conditional Equation (5) specifies a relationship between the focal length of the refractive optical portion 13 and the focal length of the diffraction optical portion 12 in a case where the diffraction optical portion 12 and the refractive optical portion 13 are provided in air. When |fanm/fdoe| exceeds the upper limit value of Conditional Equation (5), the refractive power of the diffraction optical portion 12 becomes too strong and flare generated by the diffraction optical portion 12 increases. This is not preferred. On the other hand, when |fanm/fdoe| falls below the lower limit value of Conditional Equation (5), the refractive power of the refractive optical portion 13 becomes too strong and the refractive optical portion 13 thickens. This is not preferred.

When the numerical range of Conditional Equation (5) is set as follows, a chromatic aberration correction sharing balance between the diffraction optical portion 12 and the refractive optical portion 13 is improved to easily reduce flare generated by the diffraction optical portion 12 and easily thin the refractive optical portion 13.

$$0.10 < |fanm/fdoe| < 0.70 \quad (5a)$$

The optical system according to each of the fifth to eighth embodiments satisfies the following condition in a case where a telephoto ratio (total lens length/focal length) is represented by TW.

$$0.6 < TW < 0.7 \quad (6)$$

The total lens length is an interval between a first object plane and the image plane. When the optical element OE according to each of the first to fourth embodiments is applied to a telephoto type optical system satisfying Conditional Equation (6), an effect is obtained in which an axial chromatic aberration and lateral chromatic aberration which are significantly generated by a telephoto type lens system may be excellently corrected. When the telephoto ratio falls below the lower limit value of Conditional Equation (6), it is difficult to correct the chromatic aberrations in the telephoto lens. When the telephoto ratio exceeds the upper limit value of Conditional Equation (6), an effect obtained by using the optical element OE satisfying Conditional Equations (1) and (2) is reduced.

According to each of the fifth to eight embodiments as described above, when the optical element is used for the optical system, the chromatic aberrations may be excellently corrected and the reduction in size of the entire optical system may be achieved. When the diffraction optical portion and the refractive optical portion having the extraordinary partial dispersion characteristic are brought into intimate contact with each other to suitably assign refractive powers, flare generated by the diffraction optical portion 12 may be reduced and the refractive optical portion 13 may be thinned. When both the optical portions are brought into intimate contact with each other, integral formation is facilitated in view of formability, and hence mass productivity becomes higher.

Figure 5:
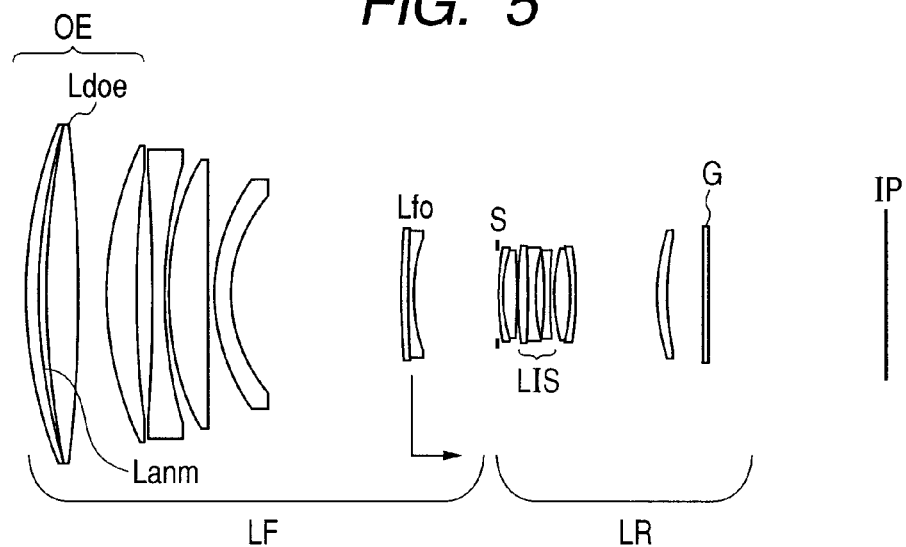
FIG. 5 is a lens cross sectional view illustrating Numerical Example 1 using the optical element according to one of the first embodiment and the second embodiment.
Figure 6:
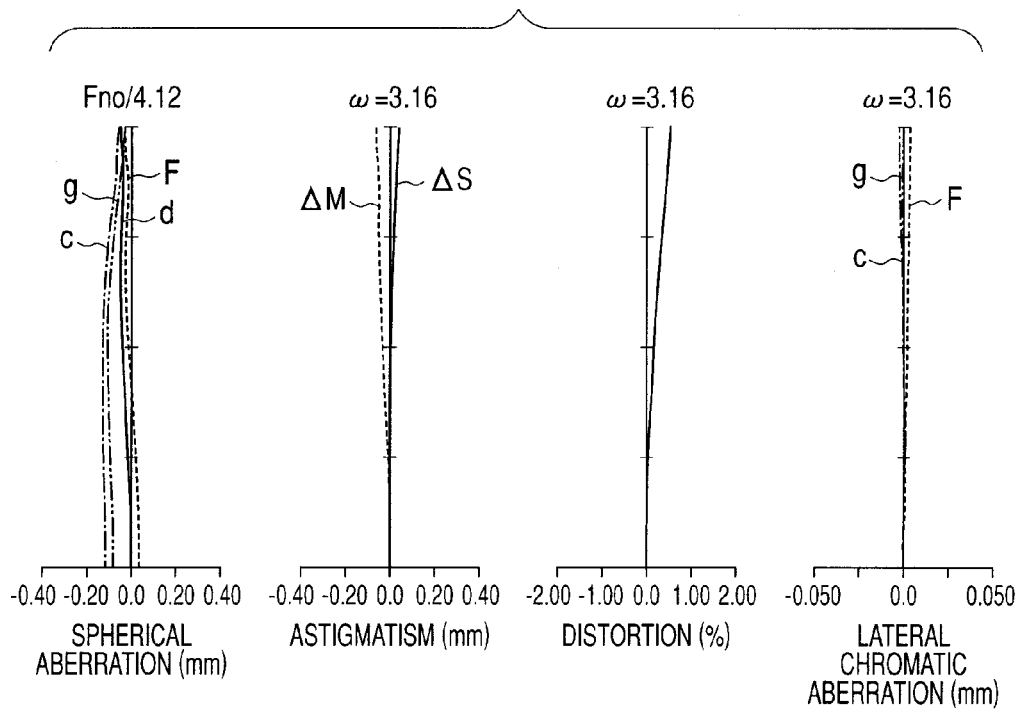
FIG. 6 is an aberration diagram in an optical system according to Numerical Example 1 when an object distance is infinite.

Next, the optical systems according to the fifth to eighth embodiments are described. The optical system according to the fifth embodiment as illustrated in FIG. 5 is a super-telephoto lens. In the lens cross sectional view illustrated in FIG. 5, the front unit LF is located closer to the object side than the aperture stop S and has a positive refractive power. The rear unit LR is located closer to the image side than the aperture stop S and has a negative refractive power. The aperture stop S is provided between the front unit LF and the rear unit LR. The optical element OE including a diffraction optical portion Ldoe and a refractive optical portion Lanm is a cemented lens located closest to the object side in the front unit LF. The diffraction optical portion Ldoe and the refractive optical portion Lanm are brought into intimate contact with each other on a cemented surface of the cemented lens. In this case, the optical element OE has the structure in which the refractive optical portion Lanm is brought into intimate contact with one side of the same diffraction optical portion Ldoe as in one of the first and second embodiments. The refractive optical portion Lanm is made of an ultraviolet curable resin which has a refractive index nd of 1.636, an Abbe number vd of 22.7, and a partial dispersion ratio $\theta gF$ of 0.69. The thickness danm of the refractive optical portion Lanm along the optical axis is equal to 2.0 mm. The thickness ddoe of the diffraction optical portion Ldoe along the optical axis is equal to 0.5 mm. The numerical values excellently satisfy the respective numerical ranges of Conditional Equations (1) to (5). The glass block G, for example, a filter is provided. The image plane IP is provided. During focusing from the infinitely distant object to the nearest object, the cemented lens Lfo located closest to the image plane side in the front unit LF is moved to the image plane side. The lens unit LIS in the rear unit LR is moved to have the component in the direction perpendicular to the optical axis, to thereby correct image blurring due to hand movement.

In the fifth embodiment, the optical element OE is used in which the diffraction optical portion Ldoe and the refractive optical portion Lanm are brought into intimate contact with each other in a position in which a paraxial on-axis ray height "h" is high and a pupil paraxial ray height ha is also high (position of cemented lens located closest to object side in front unit LF). Therefore, the axial chromatic aberration and the lateral chromatic aberration are excellently corrected at the same time. Thus, when both the diffraction optical portion Ldoe and the refractive optical portion Lanm are brought into intimate contact with each other in the position in which "h" and ha are high, refractive powers may be suitably assigned to the diffraction optical portion Ldoe and the refractive optical portion Lanm. When the refractive powers are suitably assigned to the diffraction optical portion Ldoe and the refractive optical portion Lanm, the number of zones of diffraction gratings of the diffraction optical portion Ldoe may be reduced to increase a minimum grating pitch value. Therefore, flare or ghost generated by the incidence of light inside and outside the screen on the diffraction optical portion Ldoe may be reduced. The thickness of the resin portion of the refractive optical portion Lanm may be reduced, and hence the transmittance and the formability are improved. When the lens structure as described in the fifth embodiment is employed, various aberrations, in particular, the axial chromatic aberration and the lateral chromatic aberration are excellently corrected (see FIG. 6).

Figure 7:
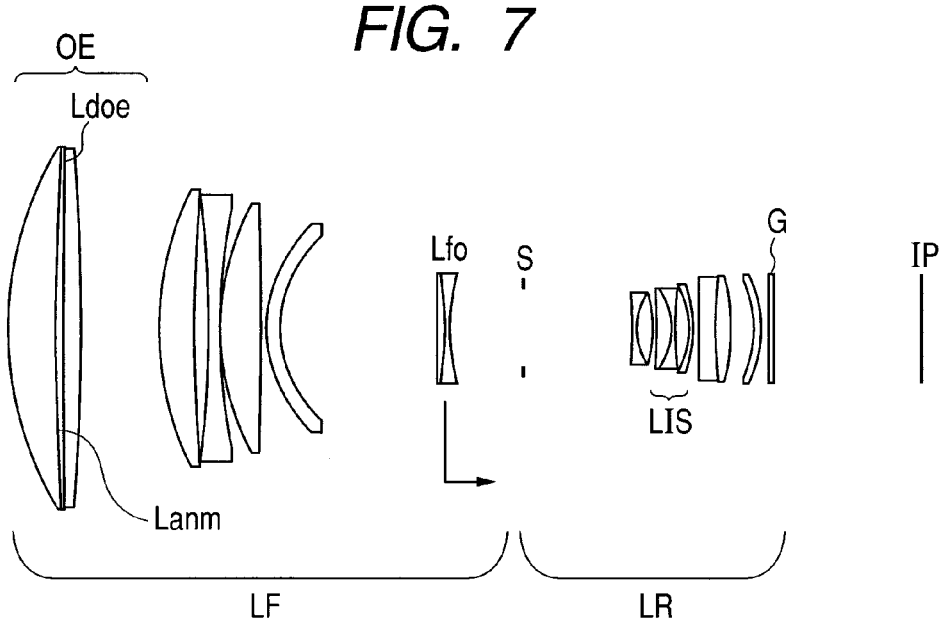
FIG. 7 is a lens cross sectional view illustrating Numerical Example 2 using the optical element according to one of the first embodiment and the second embodiment.
Figure 8:
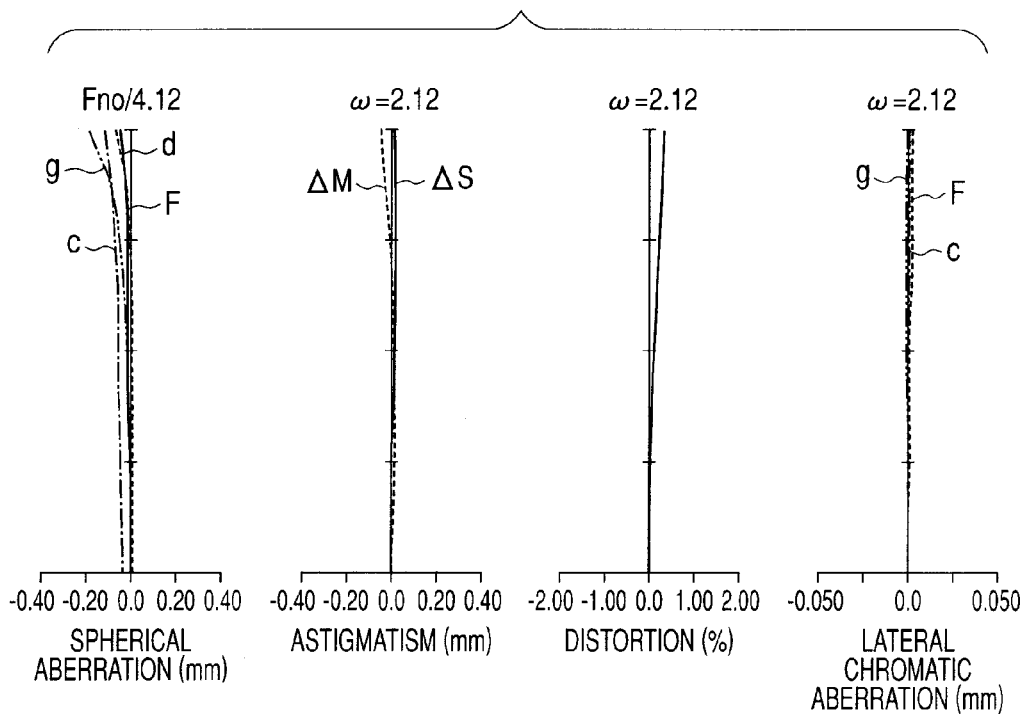
FIG. 8 is an aberration diagram in an optical system according to Numerical Example 2 when the object distance is infinite.

The optical system according to the sixth embodiment as illustrated in FIG. 7 is a super-telephoto lens. In the lens cross sectional view illustrated in FIG. 7, reference symbols for respective members are equal to the reference symbols for the members in FIG. 5. The fundamental structure of the optical system according to the sixth embodiment is the same as in the fifth embodiment. In the sixth embodiment, the optical element OE has the structure in which the refractive optical portion Lanm is brought into intimate contact with one side of the same diffraction optical portion Ldoe as in one of the first and second embodiments. The refractive optical portion Lanm is made of an ultraviolet curable resin which has a refractive index nd of 1.636, an Abbe number vd of 22.7, and a partial dispersion ratio $\theta gF$ of 0.69. The thickness danm of the refractive optical portion Lanm along the optical axis is equal to 2.5 mm. The thickness ddoe of the diffraction optical portion Ldoe along the optical axis is equal to 0.5 mm. The numerical values excellently satisfy the respective numerical ranges of Conditional Equations (1) to (5). The other structures are the same as in the fifth embodiment.

Figure 9:
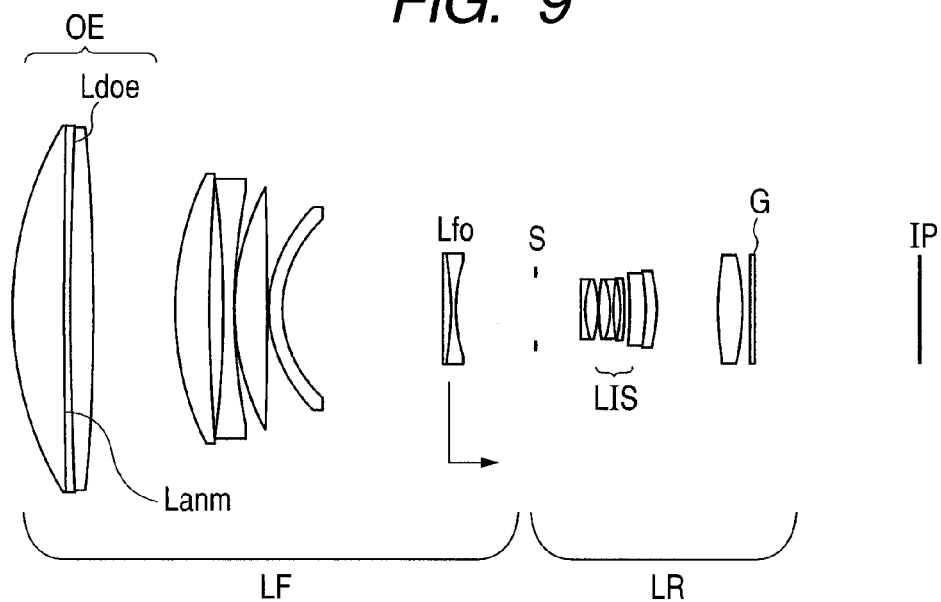
FIG. 9 is a lens cross sectional view illustrating Numerical Example 3 using the optical element according to one of the first embodiment and the second embodiment.
Figure 10:
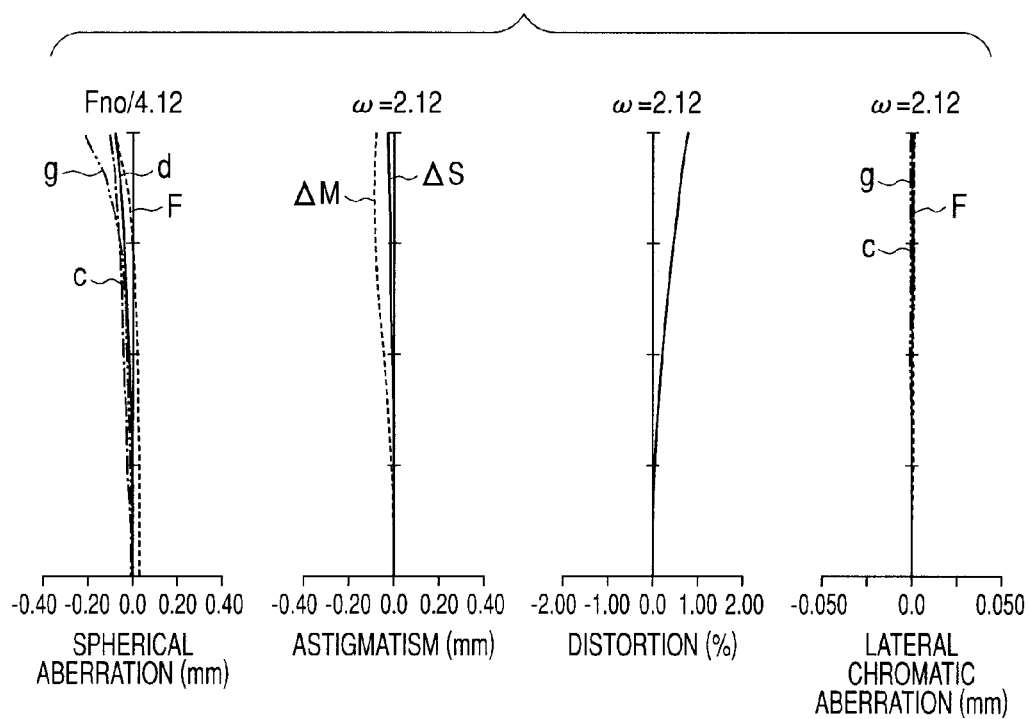
FIG. 10 is an aberration diagram in an optical system according to Numerical Example 3 when the object distance is infinite.

The optical system according to the seventh embodiment as illustrated in FIG. 9 is a super-telephoto lens. In the lens cross sectional view illustrated in FIG. 9, reference symbols for respective members are equal to the reference symbols for the members in FIG. 5. The fundamental structure of the optical system according to the seventh embodiment is the same as in the fifth embodiment. In the seventh embodiment, the optical element OE has the structure in which the refractive optical portion Lanm is brought into intimate contact with one side of the same diffraction optical portion Ldoe as in one of the first and second embodiments. The refractive optical portion Lanm is made of a fine particle dispersion material which has a refractive index nd of 1.572, an Abbe number vd of 13.5, and a partial dispersion ratio $\theta gF$ of 0.34. The thickness danm of the refractive optical portion Lanm along the optical axis is equal to 2.0 mm. The thickness ddoe of the diffraction optical portion Ldoe along the optical axis is equal to 0.5 mm. The numerical values excellently satisfy the respective numerical ranges of Conditional Equations (1) to (5). The other structures are the same as in the fifth embodiment.

Figure 11:
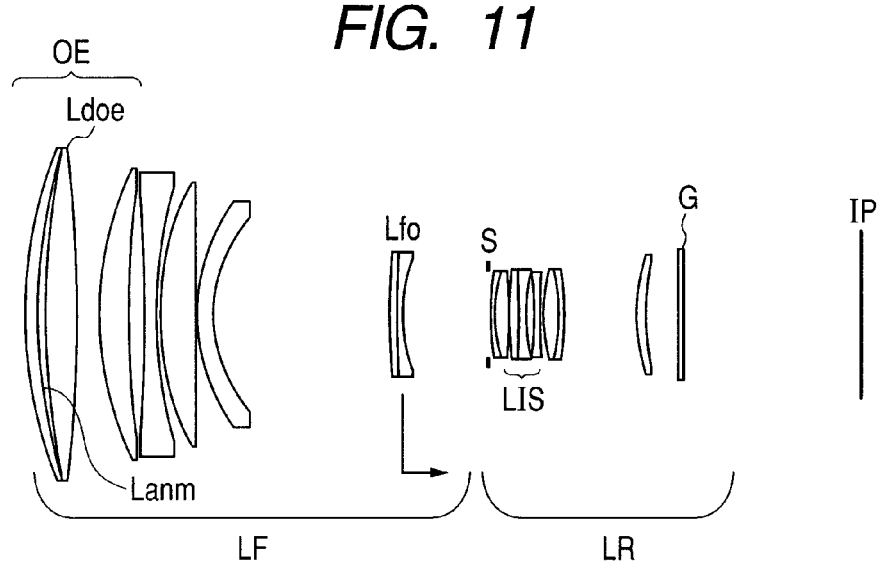
FIG. 11 is a lens cross sectional view illustrating Numerical Example 4 using the optical element according to one of the third embodiment and the fourth embodiment.
Figure 12:
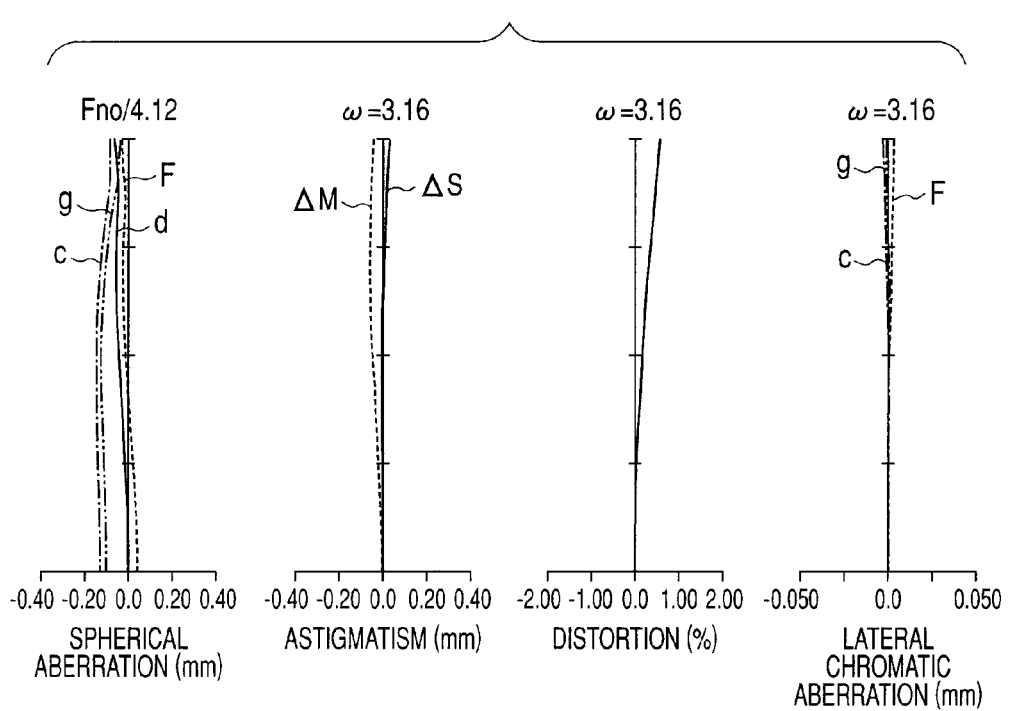
FIG. 12 is an aberration diagram in an optical system according to Numerical Example 4 when the object distance is infinite.

The optical system according to the eighth embodiment as illustrated in FIG. 11 is a super-telephoto lens. In the lens cross sectional view illustrated in FIG. 11, reference symbols for respective members are equal to the reference symbols for the members in FIG. 5. In the eighth embodiment, the optical element OE has the structure in which the refractive optical portions Lanm are brought into intimate contact with both sides of the same diffraction optical portion Ldoe as in one of the third and fourth embodiments. The refractive optical portion Lanm is made of an ultraviolet curable resin which has a refractive index nd of 1.636, an Abbe number vd of 22.7, and a partial dispersion ratio $\theta gF$ of 0.69. The total thickness danm of the two refractive optical portions Lanm along the optical axis is equal to 2.2 mm. Thicknesses danm1 and danm2 of the refractive optical portions are equal to 0.3 mm and 1.9 mm, respectively. The thickness ddoe of the diffraction optical portion Ldoe along the optical axis is equal to 0.5 mm. The numerical values excellently satisfy the respective numerical ranges of Conditional Equations (1) to (5). The other structures are the same as in the fifth embodiment. The optical system according to each of the fifth to eighth embodiments is the example of the telephoto lens. However, the present invention is not limited to this example. The optical system may be a wide-angle lens or a zoom lens.

Next, characteristics of the diffraction optical portion in the present invention are described. The diffraction optical portion has optical characteristics including negative dispersion and extraordinary partial dispersion, unlike refraction caused by conventional glass or plastic. To be specific, the Abbe number vd is equal to −3.453 and the partial dispersion ratio $\theta gF$ is equal to 0.296. When the characteristics are suitably taken for use in the refractive optical portion, chromatic aberrations are easily and excellently corrected. The grating pitch of the diffraction gratings of the diffraction optical portion used in the present invention may be changed to provide aspherical efficiency. With respect to the surface on which the diffraction optical portion is provided, when there is a difference between angles relative to a surface normal direction in respective ray incident positions of an on-axis ray and an off-axis ray which pass through respective optical systems, it is likely to degrade diffraction efficiency. Therefore, a most concentric lens surface is preferred to be set for the on-axis ray and the off-axis ray.

The diffraction optical portion is provided on the optical surface, but a curvature radius of the optical surface may be one of a spherical surface, a flat surface, an aspherical surface, and a quadratic surface. In each of the embodiments, the diffraction optical element is provided on the cemented surface of the cemented lens. However, the present invention is not limited to this case. Examples of a method of producing the diffraction optical portion in each of the embodiments, which may be applied, include a method of directly forming a binary optics shape on a lens surface by using a photo resist and a method of performing replica formation or molding formation using a mold produced in the method using the photo resist. When a kinoform having a sawtooth shape is provided, diffraction efficiency is improved, and hence diffraction efficiency close to an ideal value may be expected.

Figure 14:
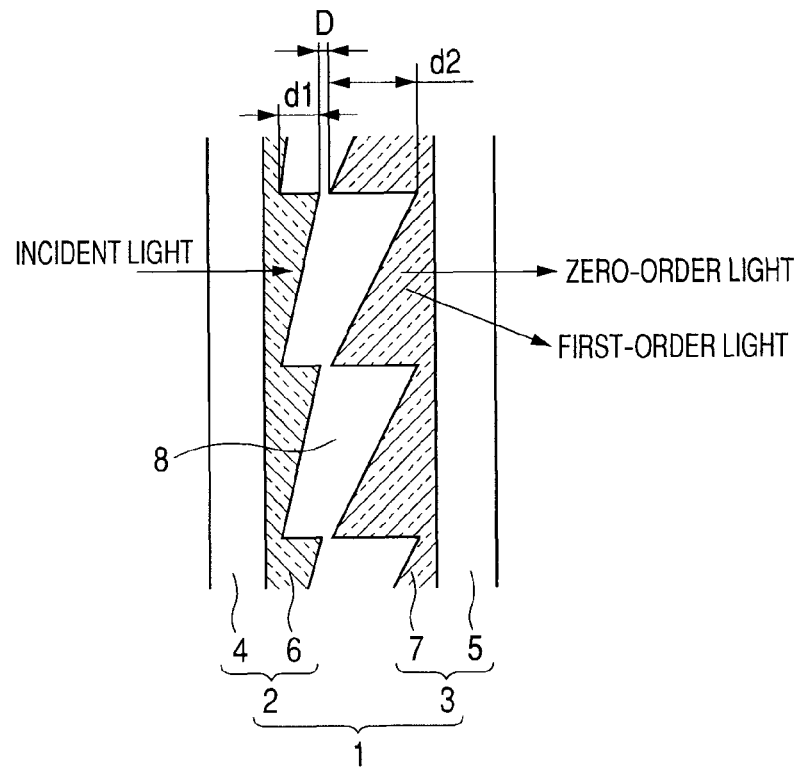
FIG. 14 is an explanatory diagram illustrating a diffraction optical element according to the present invention.
Figure 15:
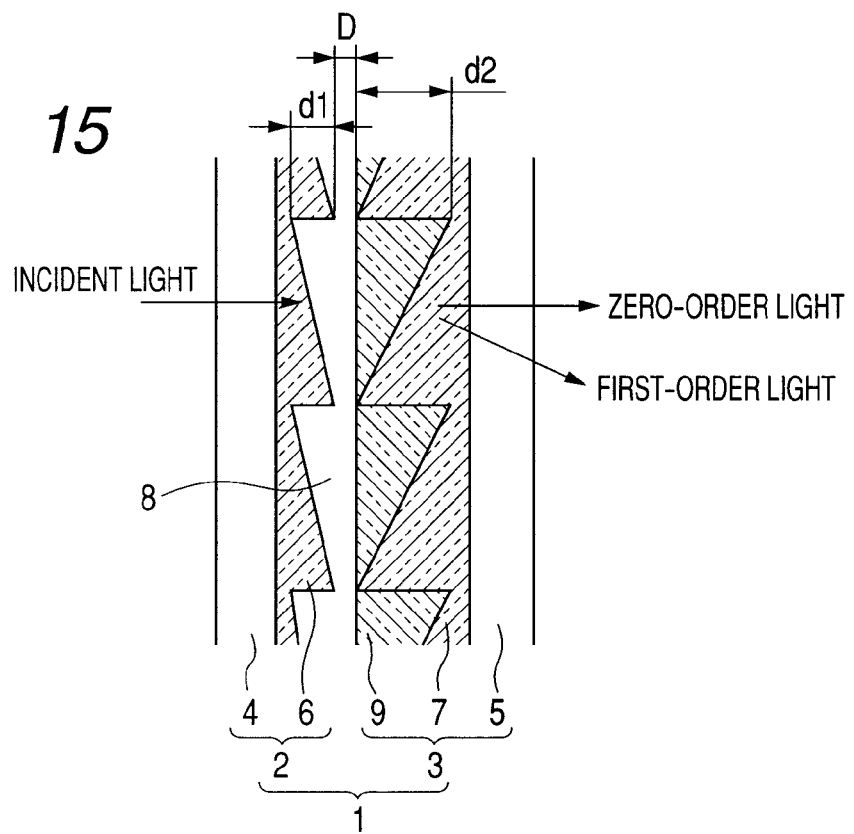
FIG. 15 is an explanatory diagram illustrating another diffraction optical element according to the present invention.
Figure 16:
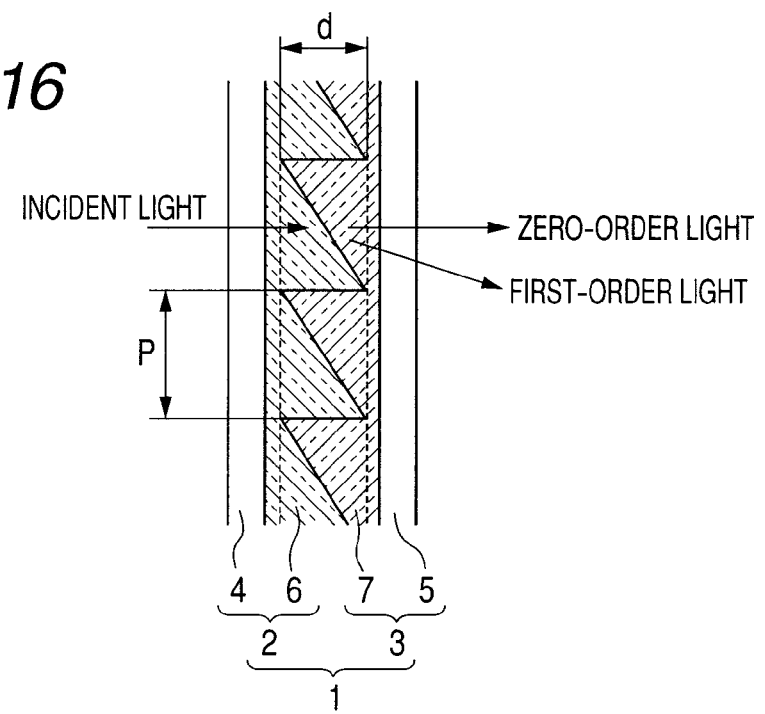
FIG. 16 is an explanatory diagram illustrating still another diffraction optical element according to the present invention.

Next, a structure of the diffraction optical portion of the optical element used in the present invention is described. Examples of the structure of the diffraction optical portion, which may be applied, include a two-layered structure in which an air layer 8 is sandwiched as illustrated in FIG. 14, a three-layered structure in which the air layer 8 is sandwiched as illustrated in FIG. 15, and a cemented two-layer structure in which two layers having the same grating thickness are brought into intimate contact with each other as illustrated in FIG. 16. In the optical element illustrated in FIG. 14, a first diffraction grating 6 made of an ultraviolet curable resin is formed on a base 4, to thereby serve as a first element portion 2. A second diffraction grating 7 made of an ultraviolet curable resin different from the ultraviolet curable resin of the first diffraction grating 6 is formed on another base 5, to thereby serve as a second element portion 3. The first element portion 2 and the second element portion 3 are provided close to each other through the air layer 8 at an interval D to serve as an optical element 1. The two diffraction gratings 6 and 7 act as a single diffraction optical portion. In this case, a grating thickness of the first diffraction grating 6 is represented by d1 and a grating thickness of the second diffraction grating 7 is represented by d2. With respect to the grating direction, as illustrated in FIG. 14, the grating thickness of the first diffraction grating 6 monotonously reduces in the direction from top to bottom. In contrast to this, the grating thickness of the second diffraction grating 7 monotonously increases in the direction from top to bottom. When incident light enters the optical element from the left side as illustrated in FIG. 14, light traveling in a right oblique downward direction is first-order light and light traveling in a straight direction is zero-order light.

Figure 17:
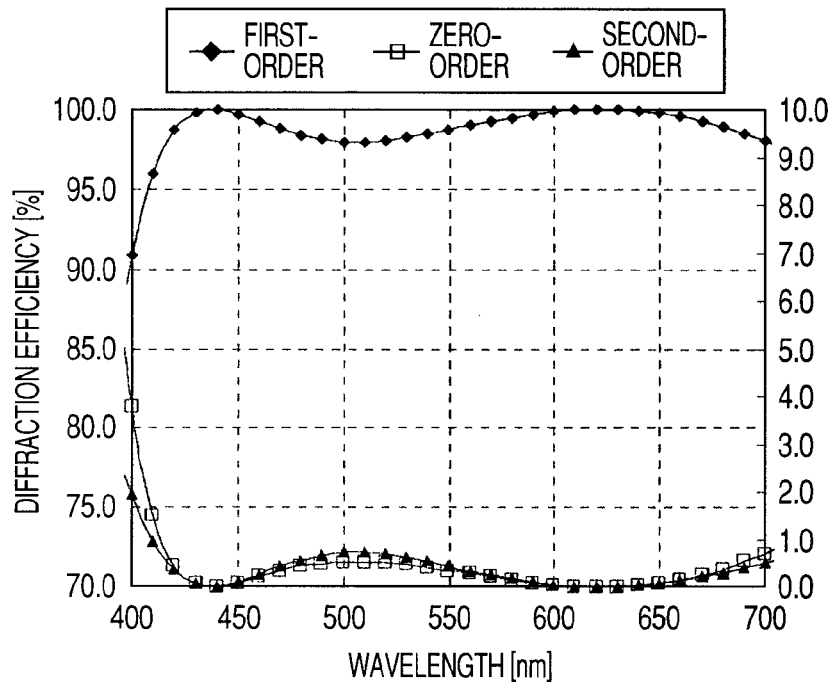
FIG. 17 is an explanatory diagram illustrating wavelength dependence characteristics of diffraction efficiencies in the diffraction optical element illustrated in FIG. 14 according to the present invention.

FIG. 17 illustrates wavelength dependence characteristics of diffraction efficiencies with respect to first-order diffraction light corresponding to the design order and zero-order diffraction light and second-order diffraction light which correspond to "(design order) ±1" in the optical element 1 having the two-layered structure as illustrated in FIG. 14. In the structure of the optical element 1, with respect to a material of the first diffraction grating 6, nd1=1.636 and vd1=22.8. The grating thickness d1 is equal to 7.88 μm. With respect to a material of the second diffraction grating 7, nd2=1.524 and vd2=51.6. The grating thickness d2 is equal to 10.71 μm. An air interval D1 is equal to 1.5 μm. The grating pitch P of the diffraction gratings 6 and 7 illustrated in FIG. 14 is equal to 200 μm. As is apparent from FIG. 17, diffraction efficiency of the design order light (first-order light) is a high value equal to or larger than approximately 90% over the entire use wavelength region. Diffraction efficiency of the unnecessary diffraction order light (zero-order light and second-order light) is suppressed to a value equal to or smaller than approximately 5% over the entire use wavelength region.

In the optical element 1 illustrated in FIG. 15, the first diffraction grating 6 made of an ultraviolet curable resin is formed on the base 4, to thereby serve as the first element portion 2. The second diffraction grating 7 made of the same ultraviolet curable resin as in the case of the first diffraction grating 6 is formed on the another base 5 and buried in a different ultraviolet curable resin (diffraction grating) 9, to thereby serve as the second element portion 3. The first diffraction grating 6 and the second diffraction gratings 7 and 9 are provided close to one another through the air layer 8 at the interval D to serve as the optical element 1. The three diffraction gratings 6, 7, and 9 act as a single diffraction optical portion. In this case, the grating thickness of the first diffraction grating 6 is represented by d1 and the grating thickness of the second diffraction gratings 7 and 9 is represented by d2. With respect to the grating direction, as illustrated in FIG. 15, the grating thicknesses of the first diffraction grating 6 and the second diffraction grating 7 monotonously increase in the direction from top to bottom. When incident light enters the optical element from the left side as illustrated in FIG. 15, light traveling in the right oblique downward direction is first-order light and light traveling in the straight direction is zero-order light.

Figure 18:
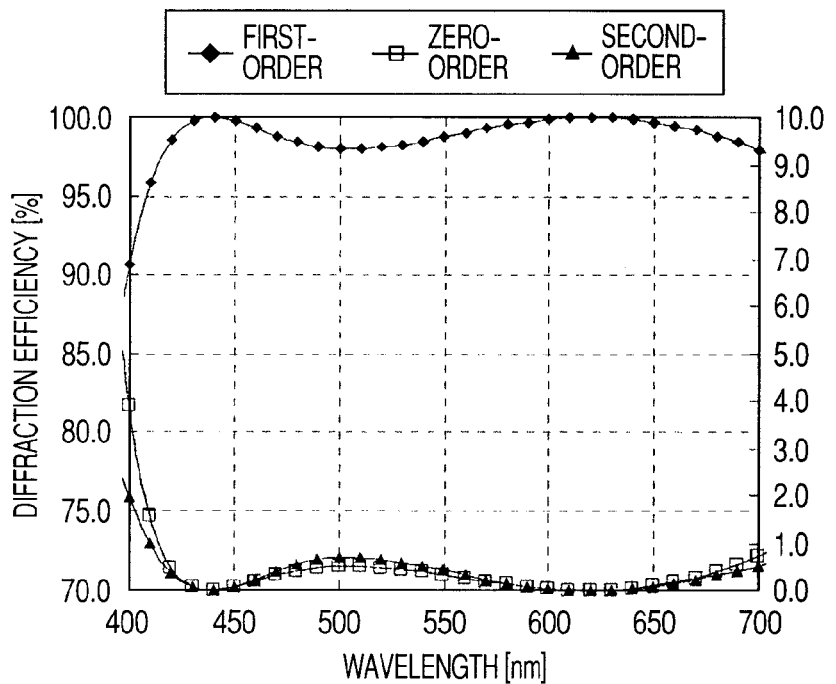
FIG. 18 is an explanatory diagram illustrating wavelength dependence characteristics of diffraction efficiencies in the diffraction optical element illustrated in FIG. 15 according to the present invention.

FIG. 18 illustrates wavelength dependence characteristics of diffraction efficiencies with respect to the first-order diffraction light corresponding to the design order and the zero-order diffraction light and the second-order diffraction light which correspond to "(design order) ±1" in the optical element 1 having the three-layered structure as illustrated in FIG. 15. In the structure of the optical element 1, with respect to a material of the first diffraction grating 6, nd1=1.636 and vd1=22.8. The grating thickness d1 is equal to 2.83 μm. With respect to a material of the second diffraction grating 7, nd2-1=1.524 and vd2-1=51.6. With respect to a material of the diffraction grating 9, nd2-2=1.636 and vd2-2=22.8. The grating thickness d2 is equal to 7.88 μm. The air interval D is equal to 1.5 μm. The grating pitch P of the diffraction gratings 6, 7, and 9 illustrated in FIG. 15 is equal to 200 μm. As is apparent from FIG. 18, as in the case of FIG. 17, diffraction efficiency of the design order light (first-order light) is a high value equal to or larger than approximately 90% over the entire use wavelength region. Diffraction efficiency of the unnecessary diffraction order light (zero-order light and second-order light) is suppressed to a value equal to or smaller than approximately 5% over the entire use wavelength region.

In the optical element 1 illustrated in FIG. 16, the first diffraction grating 6 made of an ultraviolet curable resin is formed on the base 4, to thereby serve as the first element portion 2. The second diffraction grating 7 made of an ultraviolet curable resin different from the ultraviolet curable resin of the first diffraction grating 6 is formed on the another base 5, to thereby serve as the second element portion 3. The first diffraction grating 6 and the second diffraction gratings 7 and 9 are brought into intimate contact to each other at the same grating thickness d, to thereby serve as the optical element 1. The two diffraction gratings 6 and 7. With respect to the grating direction, as illustrated in FIG. 16, the grating thickness of the first diffraction grating 6 monotonously increases in the direction from top to bottom. In contrast to this, the grating thickness of the second diffraction grating 7 monotonously reduces in the direction from top to bottom. When incident light enters the optical element from the left side as illustrated in FIG. 16, light traveling in the right oblique downward direction is first-order light and light traveling in the straight direction is zero-order light.

Figure 19:
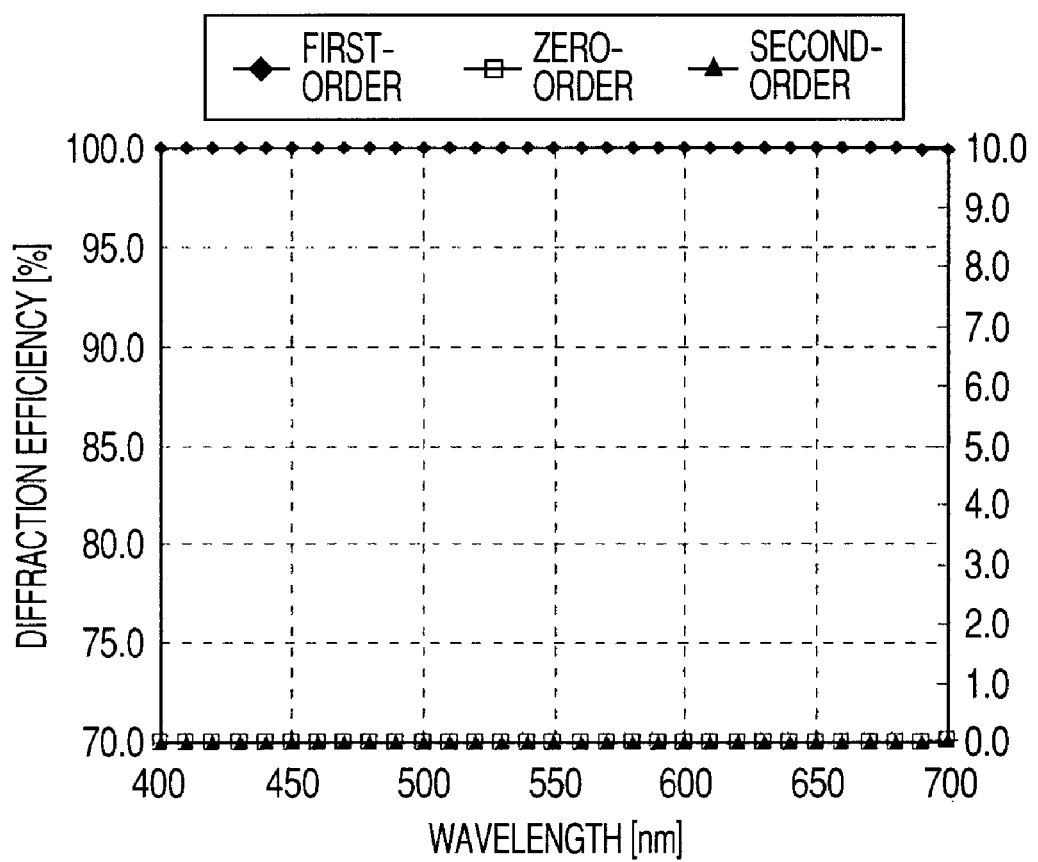
FIG. 19 is an explanatory diagram illustrating wavelength dependence characteristics of diffraction efficiencies in the diffraction optical element illustrated in FIG. 16 according to the present invention.

FIG. 19 illustrates wavelength dependence characteristics of diffraction efficiencies with respect to the first-order diffraction light corresponding to the design order and the zero-order diffraction light and the second-order diffraction light which correspond to "(design order) ±1" in the optical element 1 having the cemented two-layer structure as illustrated in FIG. 16. In the structure of the optical element 1, with respect to a material of the first diffraction grating 6, nd1=1.567 and vd1=46.6. With respect to a material of the second diffraction grating 7, nd2=1.504 and vd2=16.3. The diffraction gratings 6 and 7 have the same grating thickness d which is equal to 9.29 μm. The grating pitch P of the diffraction gratings 6 and 7 illustrated in FIG. 16 is equal to 200 μm. As is apparent from FIG. 19, diffraction efficiency of the design order light (first-order light) is a high value equal to or larger than approximately 99.5% over the entire use wavelength region, which is significantly higher than in the case of FIGS. 17 and 18. Diffraction efficiency of the unnecessary diffraction order light (zero-order light and second-order light) is also significantly suppressed to a value equal to or smaller than approximately 0.05% over the entire use wavelength region. As described above, the optical elements OE used in the present invention are described. However, when the fundamental performance including the diffraction efficiency is equal to or higher than the performance of the diffraction optical elements described above, the present invention is not limited to the optical elements OE.

Next, Numerical Examples 1 to 4 corresponding to the fifth to eighth embodiments of the present invention are described.

In each of the numerical examples, ri indicates a curvature radius of an i-th lens surface counted from the object side and di indicates an i-th on-axis surface interval counted from the object side. In addition, ndi and vdi indicate a refractive index and an Abbe number of an i-th optical member with respect to the d-line, respectively. Reference symbol Fno indicates an F-number. Assume that a diffraction order of diffraction light is represented by "m", a design wavelength is represented by λ0, a height in a direction perpendicular to the optical axis is represented by "h", and a phase coefficient is represented by Ci (i=1, 2, 3, . . . ). In this case, a phase shape ψ of the diffraction optical surface in each of the embodiments is expressed by the following expression.

$$\psi(h, m) = (2\pi/m\lambda 0) \times (C1 \cdot h^2 + C2 \cdot h^4 + C3 \cdot h^6 + \ldots)$$

Assume that X indicates the amount of displacement from a surface vertex in the optical axis direction, "h" indicates the height from the optical axis in the direction perpendicular to the optical axis, "r" indicates a paraxial curvature radius, "k" indicates a conic constant, and B, C, D, and E indicate aspherical coefficients of respective orders. In this case, an aspherical shape is expressed by the following expression. A plane of ∞ on an optical path is a dummy plane used for design. Table 1 illustrates relationships between the respective conditional equations described above and various numerical values of the numerical examples.

$$X(h) = \frac{(1/r)h^2}{1 + \sqrt{1 - (1+k)(h/r)^2}} + Bh^4 + Ch^6 + Dh^8 + Eh^{10} + \ldots$$

Numerical Example 1

Unit mm

Surface data

| Surface number | r | d | nd | vd | Effective diameter |
|---|---|---|---|---|---|
| 1 | 124.790 | 3.84 | 1.48749 | 70.2 | 95.15 |
| 2 (Diffraction) | 154.789 | 2.00 | 1.63554 | 22.7 | 94.66 |
| 3 | 202.038 | 9.76 | 1.48749 | 70.2 | 94.60 |
| 4 | −476.799 | 8.18 | | | 94.09 |
| 5 | 94.909 | 9.39 | 1.48749 | 70.2 | 83.30 |
| 6 | 366.311 | 4.24 | | | 81.91 |
| 7 | −726.662 | 4.00 | 1.85000 | 32.4 | 81.16 |
| 8 | 149.653 | 0.89 | | | 77.02 |
| 9 | 83.641 | 11.40 | 1.48749 | 70.2 | 75.56 |
| 10 | 846.877 | 2.19 | | | 73.89 |
| 11 | 54.172 | 5.30 | 2.00330 | 28.3 | 64.70 |
| 12 | 44.403 | 0.00 | | | 58.60 |
| 13 | ∞ | 0.20 | | | 64.74 |
| 14 | ∞ | 50.23 | | | 64.62 |
| 15 | 277.229 | 2.01 | 1.48749 | 70.2 | 36.06 |
| 16 | 416.088 | 1.80 | 1.43387 | 95.1 | 35.31 |
| 17 | 58.120 | 0.00 | | | 33.63 |
| 18 | ∞ | 24.80 | | | 34.51 |
| 19 (Stop) | ∞ | 0.15 | | | 25.73 |
| 20 | 68.650 | 1.30 | 2.00330 | 28.3 | 25.26 |
| 21 | 34.034 | 4.27 | 1.57099 | 50.8 | 24.39 |
| 22 | −347.173 | 0.30 | | | 23.93 |
| 23 | 88.076 | 3.47 | 1.84666 | 23.8 | 26.14 |
| 24 | −116.951 | 1.30 | 1.80400 | 46.6 | 25.46 |
| 25 | 36.527 | 3.11 | | | 23.87 |
| 26 | −78.664 | 1.30 | 1.60300 | 65.4 | 23.84 |
| 27 | 85.840 | 1.60 | | | 23.88 |
| 28 | ∞ | 0.00 | | | 23.96 |
| 29 | 56.102 | 4.91 | 1.60562 | 43.7 | 24.94 |
| 30 | −47.945 | 1.40 | 1.80400 | 46.6 | 25.35 |
| 31 | −113.163 | 24.13 | | | 25.97 |
| 32 | 56.830 | 3.03 | 1.43875 | 95.0 | 34.61 |
| 33 | 103.750 | 10.34 | | | 34.73 |
| 34 | ∞ | 2.00 | 1.51633 | 64.2 | 36.98 |
| 35 | ∞ | | | | 37.32 |
| Image plane | ∞ | | | | |

Aspherical surface data
Second surface (Diffraction surface)

| C1 = −2.49129e−005 | C2 = 1.28547e−009 |
|---|---|

Various data

| Focal length | 392.03 |
|---|---|
| F-number | 4.12 |
| Field angle | 3.16 |
| Image height | 21.64 |
| Total lens length | 256.07 |
| BF | 53.22 |
| Incident pupil position | 547.39 |
| Exit pupil position | −59.79 |
| Front principal point position | −420.54 |
| Rear principal point position | −338.81 |

Zoom lens unit data

| Lens | First surface | Focal length |
|---|---|---|
| 1 | 1 | 1193.09 |
| 2 | 2 | 974.65 |
| 3 | 3 | 292.47 |

-continued

Unit mm

| | | |
|---|---|---|
| 4 | 5 | 259.83 |
| 5 | 7 | −145.69 |
| 6 | 9 | 189.45 |
| 7 | 11 | −336.99 |
| 8 | 15 | 1696.01 |
| 9 | 16 | −155.95 |
| 10 | 20 | −68.57 |
| 11 | 21 | 54.51 |
| 12 | 23 | 59.80 |
| 13 | 24 | −34.49 |
| 14 | 26 | −67.87 |
| 15 | 29 | 43.46 |
| 16 | 30 | −104.47 |
| 17 | 32 | 280.87 |
| 18 | 34 | 0.00 |

Numerical Example 2

Unit mm

Surface data

| Surface number | r | d | nd | vd | Effective diameter |
|---|---|---|---|---|---|
| 1 | 136.480 | 20.29 | 1.48749 | 70.2 | 141.99 |
| 2 (Diffraction) | 1266.598 | 2.51 | 1.63554 | 22.7 | 141.09 |
| 3 | 1955.512 | 7.81 | 1.48749 | 70.2 | 140.44 |
| 4 | −919.253 | 31.35 | | | 138.91 |
| 5 | 123.966 | 14.57 | 1.43875 | 95.0 | 107.25 |
| 6 | 670.402 | 5.81 | | | 103.89 |
| 7 | −375.529 | 4.00 | 1.88300 | 40.8 | 103.67 |
| 8 | 222.659 | 0.69 | | | 98.84 |
| 9 | 106.846 | 16.87 | 1.43387 | 95.1 | 97.07 |
| 10 | −1264.258 | 2.15 | | | 95.00 |
| 11 | 58.022 | 5.30 | 1.76200 | 40.1 | 80.51 |
| 12 | 48.875 | 0.00 | | | 73.60 |
| 13 | ∞ | 0.20 | | | 83.21 |
| 14 | ∞ | 63.88 | | | 83.09 |
| 15 | 612.685 | 3.50 | 1.83400 | 37.2 | 42.70 |
| 16 | −103.580 | 1.80 | 1.80400 | 46.6 | 42.36 |
| 17 | 81.286 | 0.00 | | | 39.92 |
| 18 | ∞ | 30.23 | | | 40.60 |
| 19 (Stop) | ∞ | 45.30 | | | 32.33 |
| 20 | −132.745 | 1.30 | 2.00330 | 28.3 | 26.48 |
| 21 | 33.779 | 6.77 | 1.65412 | 39.7 | 27.37 |
| 22 | −48.751 | 1.50 | | | 28.16 |
| 23 | −224.685 | 6.19 | 1.68893 | 31.1 | 29.17 |
| 24 | −24.978 | 1.30 | 1.49700 | 81.5 | 29.61 |
| 25 | 123.609 | 5.83 | | | 30.31 |
| 26 | −29.813 | 1.30 | 1.88300 | 40.8 | 30.50 |
| 27 | −50.974 | 2.00 | | | 32.44 |
| 28 | ∞ | 0.00 | | | 35.64 |
| 29 | 353.819 | 7.00 | 1.65412 | 39.7 | 35.95 |
| 30 | 126.214 | 6.69 | 1.81600 | 46.6 | 38.83 |
| 31 | −84.786 | 9.52 | | | 39.66 |
| 32 | −49.802 | 3.25 | 1.57099 | 50.8 | 40.76 |
| 33 | −42.545 | 3.00 | | | 41.65 |
| 34 | ∞ | 2.00 | 1.51633 | 64.2 | 41.86 |
| 35 | ∞ | | | | 41.90 |
| Image plane | ∞ | | | | |

Aspherical surface data
Second surface (Diffraction surface)

C1 = −1.20000e−005   C2 = 4.12000e−012   C3 = −1.01000e−014

Various data

| | |
|---|---|
| Focal length | 584.96 |
| F-number | 4.12 |
| Field angle | 2.12 |
| Image height | 21.64 |

-continued

Unit mm

| | |
|---|---|
| Total lens length | 374.37 |
| BF | 60.47 |
| Incident pupil position | 1026.31 |
| Exit pupil position | −182.43 |
| Front principal point position | 202.58 |
| Rear principal point position | −524.49 |

Zoom lens unit data

| Lens | First surface | Focal length |
|---|---|---|
| 1 | 1 | 309.73 |
| 2 | 2 | 4974.33 |
| 3 | 3 | 1283.85 |
| 4 | 5 | 343.85 |
| 5 | 7 | −157.81 |
| 6 | 9 | 227.92 |
| 7 | 11 | −542.88 |
| 8 | 15 | 106.47 |
| 9 | 16 | −56.40 |
| 10 | 20 | −26.73 |
| 11 | 21 | 31.53 |
| 12 | 23 | 40.28 |
| 13 | 24 | −41.69 |
| 14 | 26 | −83.75 |
| 15 | 29 | −303.65 |
| 16 | 30 | 63.05 |
| 17 | 32 | 439.68 |
| 18 | 34 | 0.00 |

Numerical Example 3

Unit mm

Surface data

| Surface number | r | d | nd | vd | Effective diameter |
|---|---|---|---|---|---|
| 1 | 136.795 | 21.90 | 1.48749 | 70.2 | 145.12 |
| 2 (Diffraction) | 2676.639 | 2.00 | 1.57160 | 13.5 | 144.22 |
| 3 | 1292.008 | 10.16 | 1.48749 | 70.2 | 142.97 |
| 4 | −841.970 | 33.52 | | | 140.68 |
| 5 | 125.067 | 14.54 | 1.43875 | 95.0 | 105.43 |
| 6 | 867.815 | 5.20 | | | 102.15 |
| 7 | −378.732 | 4.00 | 1.88300 | 40.8 | 101.86 |
| 8 | 248.423 | 0.15 | | | 97.30 |
| 9 | 101.396 | 13.24 | 1.43387 | 95.1 | 94.82 |
| 10 | 3404.189 | 1.35 | | | 93.82 |
| 11 | 59.474 | 5.30 | 1.75500 | 52.3 | 80.54 |
| 12 | 49.786 | 0.00 | | | 73.64 |
| 13 | ∞ | 0.20 | | | 83.63 |
| 14 | ∞ | 65.94 | | | 83.50 |
| 15 | 618.327 | 3.50 | 1.83400 | 37.2 | 41.24 |
| 16 | −97.531 | 1.80 | 1.80400 | 46.6 | 40.88 |
| 17 | 87.214 | 0.00 | | | 38.53 |
| 18 | ∞ | 33.23 | | | 39.24 |
| 19 (Stop) | ∞ | 18.94 | | | 28.39 |
| 20 | −146.979 | 1.30 | 2.00330 | 28.3 | 22.34 |
| 21 | 37.227 | 4.70 | 1.65412 | 39.7 | 22.05 |
| 22 | −50.323 | 1.50 | | | 22.11 |
| 23 | 269.415 | 4.39 | 1.68893 | 31.1 | 21.88 |
| 24 | −28.902 | 1.30 | 1.49700 | 81.5 | 22.11 |
| 25 | 66.596 | 2.99 | | | 22.23 |
| 26 | −34.242 | 1.30 | 1.88300 | 40.8 | 22.27 |
| 27 | −144.796 | 2.00 | | | 23.42 |
| 28 | ∞ | 0.00 | | | 25.12 |
| 29 | −299.339 | 6.63 | 1.65412 | 39.7 | 24.94 |
| 30 | −96.847 | 4.45 | 1.81600 | 46.6 | 27.51 |
| 31 | −69.371 | 25.55 | | | 29.15 |
| 32 | 130.528 | 10.00 | 1.51633 | 64.1 | 41.05 |
| 33 | −102.250 | 3.00 | | | 42.02 |
| 34 | ∞ | 2.00 | 1.51633 | 64.2 | 42.13 |

-continued

Unit mm

| | | |
|---|---|---|
| 35 | ∞ | 42.16 |
| Image plane | ∞ | |

Aspherical surface data
Second surface (Diffraction surface)

| | |
|---|---|
| C1 = 6.39402e−006 | C2 = 1.66565e−011 |

Various data

| | |
|---|---|
| Focal length | 584.98 |
| F-number | 4.12 |
| Field angle | 2.12 |
| Image height | 21.64 |
| Total lens length | 374.38 |
| BF | 68.28 |
| Incident pupil position | 1190.28 |
| Exit pupil position | −181.65 |
| Front principal point position | 406.08 |
| Rear principal point position | −516.70 |

Zoom lens unit data

| Lens | First surface | Focal length |
|---|---|---|
| 1 | 1 | 295.95 |
| 2 | 2 | −4140.20 |
| 3 | 3 | 1047.33 |
| 4 | 5 | 331.08 |
| 5 | 7 | −169.39 |
| 6 | 9 | 240.58 |
| 7 | 11 | −529.37 |
| 8 | 15 | 101.24 |
| 9 | 16 | −57.02 |
| 10 | 20 | −29.50 |
| 11 | 21 | 33.42 |
| 12 | 23 | 38.12 |
| 13 | 24 | −40.37 |
| 14 | 26 | −51.07 |
| 15 | 29 | 216.07 |
| 16 | 30 | 279.31 |
| 17 | 32 | 112.69 |
| 18 | 34 | 0.00 |

Numerical Example 4

Unit mm

Surface data

| Surface number | r | d | nd | vd | Effective diameter |
|---|---|---|---|---|---|
| 1 | 125.073 | 3.64 | 1.48749 | 70.2 | 95.15 |
| 2 | 151.479 | 0.28 | 1.63554 | 22.7 | 94.66 |
| 3 (Diffraction) | 154.789 | 1.87 | 1.63554 | 22.7 | 94.63 |
| 4 | 201.107 | 9.82 | 1.48749 | 70.2 | 94.60 |
| 5 | −471.734 | 7.31 | | | 94.08 |
| 6 | 94.826 | 9.21 | 1.48749 | 70.2 | 83.66 |
| 7 | 367.516 | 4.17 | | | 82.43 |
| 8 | −730.675 | 4.00 | 1.85000 | 32.4 | 81.78 |
| 9 | 149.174 | 0.15 | | | 77.58 |
| 10 | 84.597 | 10.91 | 1.48749 | 70.2 | 76.34 |
| 11 | 943.072 | 1.91 | | | 75.01 |
| 12 | 55.432 | 5.30 | 2.00330 | 28.3 | 65.86 |
| 13 | 45.319 | 0.00 | | | 59.66 |
| 14 | ∞ | 0.20 | | | 65.92 |
| 15 | ∞ | 52.8 | | | 65.81 |
| 16 | 363.750 | 2.50 | 1.48749 | 70.2 | 36.03 |
| 17 | −614.904 | 1.80 | 1.43387 | 95.1 | 35.30 |
| 18 | 58.754 | 0.00 | | | 33.41 |
| 19 | ∞ | 26.44 | | | 34.26 |
| 20 (Stop) | ∞ | 0.15 | | | 25.05 |
| 21 | 65.490 | 1.30 | 2.00330 | 28.3 | 24.60 |
| 22 | 32.716 | 4.25 | 1.57099 | 50.8 | 23.73 |
| 23 | −309.789 | 0.30 | | | 23.27 |
| 24 | 92.662 | 3.42 | 1.84666 | 23.8 | 25.53 |
| 25 | −104.923 | 1.30 | 1.80400 | 46.6 | 24.86 |
| 26 | 37.446 | 2.93 | | | 23.35 |
| 27 | −78.923 | 1.30 | 1.60300 | 65.4 | 23.31 |
| 28 | 76.840 | 1.60 | | | 23.35 |
| 29 | ∞ | 0.00 | | | 23.47 |
| 30 | 55.791 | 4.56 | 1.60562 | 43.7 | 24.44 |
| 31 | −55.546 | 1.40 | 1.80400 | 46.6 | 24.87 |
| 32 | −128.840 | 22.43 | | | 25.44 |
| 33 | 59.270 | 3.24 | 1.43875 | 95.0 | 34.13 |
| 34 | 137.687 | 9.75 | | | 34.31 |
| 35 | ∞ | 2.00 | 1.51633 | 64.2 | 36.56 |
| 36 | ∞ | | | | 36.90 |
| Image plane | ∞ | | | | |

Aspherical surface data
Third surface (Diffraction surface)

| | |
|---|---|
| C1 = −2.49129e−005 | C2 = 1.28547e−009 |

Various data

| | |
|---|---|
| Focal length | 392.04 |
| F-number | 4.12 |
| Field angle | 3.16 |
| Image height | 21.64 |
| Total lens length | 256.07 |
| BF | 53.83 |
| Incident pupil position | 578.93 |
| Exit pupil position | −57.83 |
| Front principal point position | −405.57 |
| Rear principal point position | −338.21 |

Zoom lens unit data

| Lens | First surface | Focal length |
|---|---|---|
| 1 | 1 | 1408.16 |
| 2 | 2 | 7021.81 |
| 3 | 3 | 989.64 |
| 4 | 4 | 290.62 |
| 5 | 6 | 259.29 |
| 6 | 8 | −145.44 |
| 7 | 10 | 189.85 |
| 8 | 12 | −335.67 |
| 9 | 16 | 469.22 |
| 10 | 17 | −123.51 |
| 11 | 21 | −66.48 |
| 12 | 22 | 52.06 |
| 13 | 24 | 58.58 |
| 14 | 25 | −34.19 |
| 15 | 27 | −64.36 |
| 16 | 30 | 46.68 |
| 17 | 31 | −122.49 |
| 18 | 33 | 234.25 |
| 19 | 35 | 0.00 |

TABLE 1

Numerical values of conditional equations in respective embodiments

| Conditional equation | Numerical Example 1 (Fifth embodiment) | Numerical Example 2 (Sixth embodiment) | Numerical Example 3 (Seventh embodiment) | Numerical Example 4 (Eighth embodiment) |
|---|---|---|---|---|
| (1) | 0.065 | 0.065 | 0.317 | 0.065 |
| (2) | 22.73 | 22.73 | 13.51 | 22.73 |
| (3) | 0.025 | 0.020 | 0.025 | 0.023 |
| (4) | 0.050 | 0.050 | 0.050 | 0.050 |

TABLE 1-continued

Numerical values of conditional equations in respective embodiments

| Conditional equation | Numerical Example 1 (Fifth embodiment) | Numerical Example 2 (Sixth embodiment) | Numerical Example 3 (Seventh embodiment) | Numerical Example 4 (Eighth embodiment) |
|---|---|---|---|---|
| (5) | 0.270 | 0.548 | 0.409 | 0.254 |
| (6) | 0.65 | 0.64 | 0.64 | 0.65 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-144177, filed Jun. 17, 2009, which is hereby incorporated by reference herein in its entirety.

What is claimed is:

1. An optical element, comprising a cemented portion including:
   a diffraction optical portion including a plurality of diffraction gratings which are layered, the diffraction optical portion having a light incident surface and a light exiting surface; and
   a refractive optical portion which includes a solid material and has a refraction action,
   the refractive optical portion being in intimate contact with at least one of the light incident surface and the light exiting surface,
   wherein the following conditional equations are satisfied:

$0.01 < |\Delta\theta gF| < 0.50$; and $vd < 60$, where $vd$ and $\theta gF$ indicate an Abbe number and a partial dispersion ratio of the solid material, respectively, and $\Delta\theta gF$ indicates an extraordinary partial dispersion ratio and
   where $\Delta\theta gF = \theta gF - (-1.665 \times 10^{-7} \times vd^3 + 5.213 \times 10^{-5} \times vd^2 - 5.656 \times 10^{-3} \times vd + 0.7278)$.

2. An optical element according to claim 1, wherein the following conditional equations are satisfied:

$0.001 < ddoe/danm \leq 1.000$; and $ddoe \leq 0.1$ (mm), where ddoe indicates a thickness of the diffraction optical portion along an optical axis and danm indicates a thickness of the refractive optical portion along the optical axis,
   wherein when a plurality of diffraction optical portions and a plurality of refractive optical portions are provided, ddoe indicates a sum of thicknesses of the plurality of diffraction optical portions along the optical axis and ddoe indicates a sum of thicknesses of the plurality of refractive optical portions along the optical axis.

3. An optical element according to claim 1, wherein the solid material of the refractive optical portion includes a mixture in which one of an ultraviolet curable resin and an inorganic fine particle is dispersed in a resin material.

4. An optical element according to claim 1, wherein the diffraction optical portion comprises a material including a mixture in which one of a group including at least two different ultraviolet curable resins and a group including at least two different inorganic fine particles is dispersed in a resin material.

5. An optical element according to claim 1, wherein a solid material of the refractive optical portion and materials of the diffraction optical portion are all different from one another.

6. An optical element according to claim 1, wherein a solid material of the refractive optical portion is identical to at least one of materials of the diffraction optical portion.

7. An optical element according to claim 1, further comprising two optical members,
   wherein the cemented portion is sandwiched by the two optical members to be in intimate contact therewith.

8. An optical system comprising the optical element according to claim 1.

9. An optical system according to claim 8, wherein the following conditional equation is satisfied, $0.001 < |fanm/fdoe| < 1.00$, where fanm indicates a focal length of the refractive optical portion and fdoe indicates a focal length of the diffraction optical portion.

10. An optical system according to claim 8, wherein the following condition is satisfied, $0.6 < TW < 0.7$, where TW indicates a telephoto ratio of the optical system.

11. An optical device comprising the optical system according to claim 8.

* * * * *